(12) United States Patent
Gadylshin et al.

(10) Patent No.: US 11,009,617 B2
(45) Date of Patent: May 18, 2021

(54) METHOD FOR FAST CALCULATION OF SEISMIC ATTRIBUTES USING ARTIFICIAL INTELLIGENCE

(71) Applicant: Saudi Arabian Oil Company, Dhahran (SA)

(72) Inventors: Kirill Gadylshin, Novosibirsk (RU); Andrey Bakulin, Dhahran (SA); Ilya Silvestrov, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/788,500

(22) Filed: Feb. 12, 2020

(65) Prior Publication Data

US 2020/0264327 A1    Aug. 20, 2020

Related U.S. Application Data

(60) Provisional application No. 62/807,881, filed on Feb. 20, 2019.

(51) Int. Cl.
*G01V 1/30* (2006.01)
*G06T 5/00* (2006.01)
*G06N 3/04* (2006.01)

(52) U.S. Cl.
CPC ............ *G01V 1/307* (2013.01); *G06N 3/04* (2013.01); *G06T 5/005* (2013.01);
(Continued)

(58) Field of Classification Search
CPC .............. G01V 1/307; G06T 5/005; G06T 2207/20081; G06T 2207/10024; G06T 2207/20084; G06N 3/04
See application file for complete search history.

(56) References Cited

U.S. PATENT DOCUMENTS 5,453,958 A * 9/1995 Neff .................. G01V 1/34
367/70
5,930,730 A * 7/1999 Marfurt .............. G01V 1/301
702/16

(Continued)

FOREIGN PATENT DOCUMENTS

WO     2018148492 A1    8/2018

OTHER PUBLICATIONS

Heinrich L., et al., "Deep Learning for Isotropic Super-Resolution from Non-Isotropic 3D Electron Microscopy," arXiv:1706.03142v1 [cs.CV], Jun. 9, 2017.*

(Continued)

*Primary Examiner* — Xuemei G Chen

(74) *Attorney, Agent, or Firm* — Leason Ellis LLP

(57) ABSTRACT

A system, a method, and a computer program for modelling a subsurface region of the earth for hydrocarbon exploration, development, or production, including receiving a seismic prestack dataset, determining one or more multiparameter attributes on a sparse grid based on the seismic prestack dataset, associating the one or more multiparameter attributes with color image pixels, encoding the associated one or more multiparameter attributes to generate a low-resolution colored image, inpainting the low-resolution colored image by a deep neural network to build a high-resolution colored image, and decoloring the high-resolution image.

27 Claims, 13 Drawing Sheets

(52) U.S. Cl.
CPC ............... *G06T 2207/10024* (2013.01); *G06T 2207/20081* (2013.01); *G06T 2207/20084* (2013.01)

(56) References Cited

U.S. PATENT DOCUMENTS

| | | | | |
|---|---|---|---|---|
| 6,226,596 | B1* | 5/2001 | Gao | G01V 1/32 367/73 |
| 6,571,177 | B1* | 5/2003 | Hardy | G01V 1/34 702/16 |
| 7,218,573 | B1* | 5/2007 | Laake | G01V 1/364 345/603 |
| 8,923,094 | B2* | 12/2014 | Jing | G01V 1/288 367/73 |
| 9,952,340 | B2* | 4/2018 | Bas | G01V 1/301 |
| 9,977,996 | B2 | 5/2018 | Yamada et al. | |
| 10,499,069 | B2* | 12/2019 | Wang | G06N 3/04 |
| 10,663,609 | B2* | 5/2020 | Al-Dossary | G01V 1/345 |
| 2013/0262061 | A1* | 10/2013 | Laake | G06T 5/003 703/6 |
| 2014/0278106 | A1* | 9/2014 | Mallet | G01V 99/005 702/2 |
| 2014/0278117 | A1* | 9/2014 | Dobin | G01V 1/345 702/16 |
| 2015/0124560 | A1* | 5/2015 | Li | G01V 1/36 367/14 |
| 2015/0253445 | A1* | 9/2015 | Luo | G01V 1/345 702/16 |
| 2015/0316683 | A1* | 11/2015 | Purves | G01V 99/005 703/2 |
| 2016/0086352 | A1* | 3/2016 | Birkbeck | G06T 17/05 382/109 |
| 2016/0267382 | A1* | 9/2016 | Sullivan | G06N 5/022 |
| 2016/0282489 | A1* | 9/2016 | Al-Dossary | G01V 1/282 |
| 2016/0377754 | A1* | 12/2016 | Malik | G01V 1/40 702/16 |
| 2017/0219729 | A1* | 8/2017 | Yan | G01V 1/362 |
| 2018/0075581 | A1* | 3/2018 | Shi | G06N 3/0472 |
| 2018/0122048 | A1* | 5/2018 | Wang | G06N 3/0454 |
| 2018/0292555 | A1* | 10/2018 | Sun | G06T 5/10 |
| 2018/0347347 | A1* | 12/2018 | Bakulin | G01V 1/003 |
| 2018/0364380 | A1* | 12/2018 | Bekara | G01V 1/301 |
| 2019/0295227 | A1* | 9/2019 | Wang | G06K 9/4628 |
| 2019/0353811 | A1* | 11/2019 | Le Bouteiller | G01V 1/301 |
| 2019/0383965 | A1* | 12/2019 | Salman | G01V 99/005 |
| 2020/0098144 | A1* | 3/2020 | Norouzi | G06T 11/40 |
| 2020/0132871 | A1* | 4/2020 | Jiao | G01V 1/28 |
| 2020/0258196 | A1* | 8/2020 | Kokura | G06T 3/4076 |

OTHER PUBLICATIONS

Bakulin, Andrey, et al. "Nonlinear beamforming for enhancing prestack seismic data with a challenging near surface or overburden." First Break 36.12 (2018): 121-126.

Liu, Guilin, et al. "Image inpainting for irregular holes using partial convolutions." Proceedings of the European Conference on Computer Vision (ECCV). 2018.

Ronneberger, Olaf, Philipp Fischer, and Thomas Brox. "U-net: Convolutional networks for biomedical image segmentation." International Conference on Medical image computing and computer-assisted intervention. Springer, Cham, 2015.

Araya-Polo, Mauricio, et al. "Automated fault detection without seismic processing." The Leading Edge 36.3 (2017): 208-214.

Baykulov, Mikhail, and Dirk Gajewski. "Prestack seismic data enhancement with partial common-reflection-surface (CRS) stack." Geophysics 74.3 (2009): V49-V58.

Berkovitch, Alex, et al. "Non-hyperbolic MultiFocusing improves depth imaging." 11th Simposio Bolivariano-Exploracion Petrolera en las Cuencas Subandinas. European Association of Geoscientists & Engineers, 2012.

Fomel, Sergey. "Velocity-independent time-domain seismic imaging using local event slopes." Geophysics 72.3 (2007): S139-S147.

Halpert, Adam D. "Deep learning-enabled seismic image enhancement." SEG Technical Program Expanded Abstracts 2018. Society of Exploration Geophysicists, 2018. 2081-2085.

Goodfellow, Ian, Yoshua Bengio, and Aaron Courville. Deep learning. MIT press, 2016.

Lambaré, Gilles. "Stereotomography." Geophysics 73.5 (2008): VE25-VE34.

Dmitri Bevc et al " Inpainting of local wavefront attributes using artifical intelligence", SEG Technical Program Expanded Abstracts 2019, Sep. 16, 2019, pp. 2212-2216.

International Search Report and Written Opinion in Corresponding PCT Application No. PCT/US2020/17916 dated Jun. 12, 2020. 12 pages.

* cited by examiner

METHOD FOR FAST CALCULATION OF SEISMIC ATTRIBUTES USING ARTIFICIAL INTELLIGENCE

CROSS-REFERENCE TO PRIOR APPLICATION

This application claims priority to and the benefit thereof from U.S. Provisional Patent Application, No. 62/807,881, filed Feb. 20, 2019, titled "METHOD FOR FAST CALCULATION OF SEISMIC ATTRIBUTES USING ARTIFICIAL INTELLIGENCE," the entirety of which is hereby incorporated herein by reference.

FIELD OF THE DISCLOSURE

The present disclosure relates to the fields of hydrocarbon exploration, development and production.

SUMMARY OF THE DISCLOSURE

There exists an unfulfilled need in the fields of hydrocarbon exploration, development and production for a technological solution that can process and analyze large amounts of sensor data (including prestack seismic data), build accurate high-resolution models, and implement the models effectively and efficiently to identify and implement hydrocarbon exploration opportunities.

The disclosure provides a novel technological solution, including a method, a system, and a computer program, that effectively and efficiently integrates and implements deep learning for processing prestack seismic data, estimating multiparameter attributes and identifying hydrocarbon exploration, development or production opportunities.

An aspect of the disclosure includes a fast method to calculate prestack seismic attributes from dense and large volumes of prestack seismic data. The method can be based on a calculation of the attributes in a limited number of locations in time and space on some coarse regular or irregular grid using one or more approaches. The method can include infilling of attributes in remaining locations by artificial intelligence utilizing a specially trained deep neural network in very fast and efficient ways. The method incorporates multiparameter attributes by a coloring scheme that can facilitate estimation of multiple attributes simultaneously during a single run. The disclosure can be applied to enhancement of prestack seismic data, or other applications such as velocity analysis or seismic tomography.

According to one non-limiting embodiment of the disclosure, a method is provided for modelling a subsurface region of the earth for hydrocarbon exploration, development, or production. The method comprises: receiving a seismic prestack dataset; determining one or more multiparameter attributes on a sparse grid based on the seismic prestack dataset; associating the one or more multiparameter attributes with color image pixels; encoding the associated one or more multiparameter attributes to generate a low-resolution colored image; inpainting the low-resolution colored image by a deep neural network to build a high-resolution colored image; and decoloring the high-resolution image. The sparse grid can comprise a coarse regular grid or a coarse irregular grid. The multiparameter attributes can comprise a dip, a curvature or a semblance. The method can further include converting the colored image into multiparameter attributes that are predicted on a dense grid. The method can further include estimating local kinematic parameters using nonlinear beamforming (NLBF). The method can further include transforming a triplet of the multiparameter attributes for each time space coordinate (t, x) to a red (R) color pixel, a green (G) color pixel, or a blue (B) color pixel. The method can further include determining a kinematic parameter on an irregular grid. Determining the kinematic parameter on the irregular grid can comprise applying a random mask to an original grid.

According to another non-limiting embodiment of the disclosure, an apparatus is provided for modelling a subsurface region of the earth for hydrocarbon exploration, development, or production. The apparatus comprises: an interface that receives seismic prestack data; an attribute determiner that calculates a plurality of attributes on a sparse grid based on the seismic prestack data; an attribute encoder that converts the plurality of attributes to a low-resolution colored image; an image inpainter that infills the low-resolution colored image to generate a high-resolution colored image; and an image processor that converts the high-resolution colored image into multiparameter attributes that are predicted on a dense grid. The sparse grid can comprise a coarse regular grid or a coarse irregular grid. The multiparameter attributes can comprise a dip, a curvature or a semblance. The image inpainter can comprise a convolutional deep neural network with U-Net architecture. The image inpainter can comprise a nonlinear beamforming data enhancement process. The attribute encoder can transform a triplet of the multiparameter attributes for each time space coordinate (t, x) to a red (R) color pixel, a green (G) color pixel, or a blue (B) color pixel. The attribute determiner can calculate a kinematic parameter on an irregular grid. The attribute determiner can apply a random mask to an original grid to calculate the kinematic parameter on the irregular grid.

According to another non-limiting embodiment of the disclosure, a non-transitory computer readable storage medium is provided that stores subsurface modelling program instructions that, when executed by a computing device, cause a model of a subsurface region of the earth for hydrocarbon exploration, development or production to be rendered on a display device. The program instructions comprise the steps of: receiving a seismic prestack dataset; determining one or more multiparameter attributes on a sparse grid based on the seismic prestack dataset; associating the one or more multiparameter attributes with color image pixels; encoding the associated one or more multiparameter attributes to generate a colored image; inpainting the low-resolution colored image by a deep neural network to build a high-resolution colored image; and decoloring the high-resolution image. The program instructions can comprise the further step of converting the colored image into multiparameter attributes that are predicted on a dense grid, or estimating local kinematic parameters using a nonlinear beamforming data enhancement process, or transforming a triplet of the multiparameter attributes for each time space coordinate (t, x) to a red (R) color pixel, a green (G) color pixel, or a blue (B) color pixel, or determining a kinematic parameter on an irregular grid. Determining the kinematic parameter on the irregular grid can comprise applying a random mask to an original grid. The sparse grid can comprise a coarse regular grid or a coarse irregular grid. The multiparameter attributes can comprise a dip, a curvature or a semblance.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
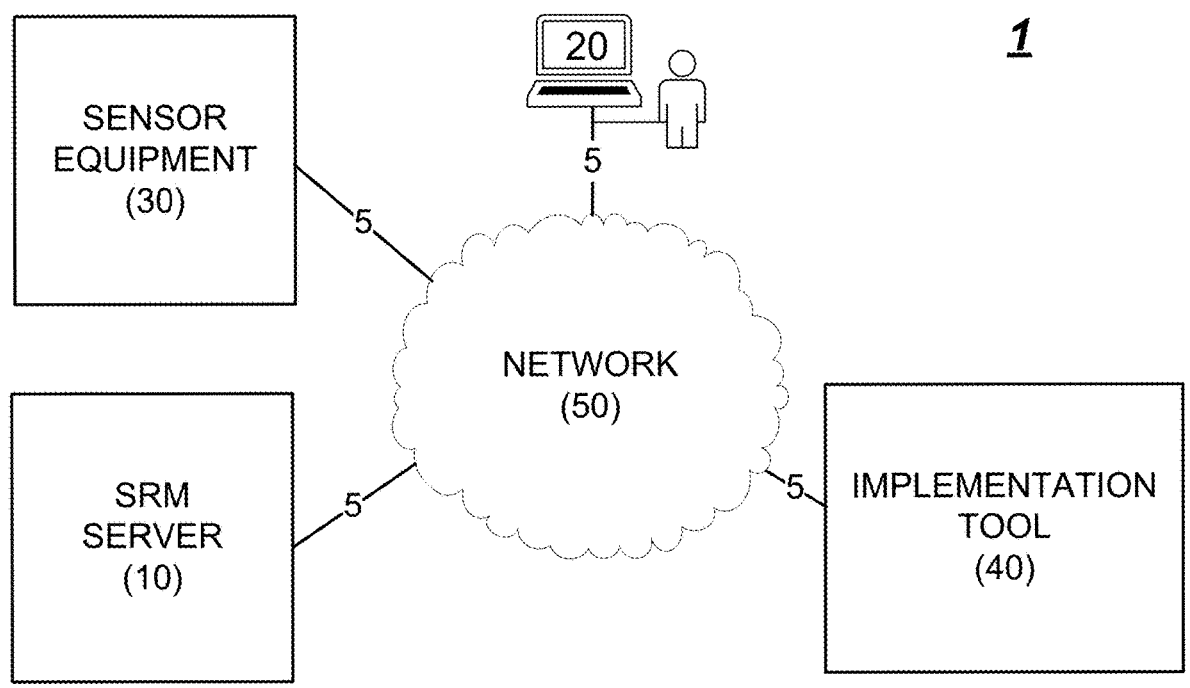
FIG. 1 shows an example of a fast-hydrocarbon modelling (FHM) system, constructed according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Subsurface modelling can be implemented in hydrocarbon exploration, development or production. Subsurface models can be generated based on sensor data that includes, for example, well log data, well test data, seismic data, production data, or any other data that can be used to model physical properties in one or more subsurface regions. The sensor data can include coordinate data or elevation data associated with, for example, well log data, well test data, seismic data or production data. The subsurface models can represent subsurface regions, including structures, cavities, faults, volumes, areas, material properties, or fluid properties. The subsurface models can represent measured data or interpreted data for each subsurface region. The subsurface models can represent material or fluid properties such as, for example, temperature, pressure, density, porosity, permeability, fluid content, volume, flow rate, or viscosity in the subsurface regions. The subsurface models can include, for example, geological models or reservoir models. The subsurface models can be employed in determining optimal placement of wells in the field.

Regarding seismic data, a seismic inversion process can be used to model a subsurface region and reconstruct or estimate material or fluid properties in the subsurface region. The seismic inversion process can include, for example, a full waveform inversion (FWI) process, which is a nonlinear data-fitting process. The seismic inversion process can be used to build a model of the subsurface and iteratively update the model to minimize inconsistencies between recorded seismic sensor data and modeled seismic sensor data. The process can combine seismic data and well log data to predict material or fluid properties in a subsurface region. The process can also use production data. These properties can be used to identify hydrocarbons and reservoirs in the subsurface region. Seismic inversion can remove imprints of wavelets in the seismic data, such as, for example, by deconvolution and conversion of results into impedance.

In building a seismic model, a variety of wave phenomena can be taken into account, including, for example, diving waves, precritical reflections, postcritical reflections, multi-scattering, free surface, internal multiples, or compressional (P) to shear (S) converted waves. A model that takes into account as many of these wave phenomena as possible can facilitate generation of a high-resolution image of the subsurface region. The model should provide an accurate parameterization of a target subsurface region that fully describes physical properties in the region and that minimizes noise, including for example, crosstalk noise between different classes of parameters.

Acquisition technology advances and needs to explore and produce hydrocarbons from challenging areas are pushing the amount of data to be processed and analyzed into the "big data" category. For instance, the prestack data from high-density seismic surveys can reach anywhere from hundreds to thousands of terabytes (terabyte=$10^{12}$ bytes) in size with reduced signal-to-noise ratio. Therefore, a technological solution is necessary to efficiently process and interpret these large amounts of data.

A way to leverage large seismic datasets is to use prestack seismic attributes, such as, for example, derivatives of the recorded sensor data, and to represent the datasets in more compressed and informative form. These attributes can be used at different steps of data processing and analysis. An example of an attribute is a normal-moveout velocity, which can be selected on a coarse grid and then interpolated between grid points to obtain a stacked seismic section. In many cases, the number of attributes that correspond to each point in a data cube can be greater than one, and the attributes can be calculated simultaneously. Multidimensional data-driven local stacking and data-enhancement techniques can be used, including, for example, a partial common-reflection surfaces stack, nonhyperbolic multi-focusing or nonlinear beamforming, which can be based on estimations of locally coherent events in the data. The estimations can be performed on a regular grid, and the output can include locally estimated dips, curvatures and semblance of seismic wavefronts. This part of the process can be the most time consuming, and its speed-up can be of significant interest and practical need. Similarly, prestack kinematic attributes can be used in seismic reflection tomography based on, for example, stereotomograpy approaches, as well as for other processing steps.

According to a non-limiting embodiment of the disclosure, a fast-seismic attributes determination process is provided that can include a deep neural network (DNN). The DNN can include a deep neural network with partial convolutional layers. The process can include training the deep neural network to provide a high-resolution output for a given low-resolution input.

FIG. 1 shows an example of a fast-hydrocarbon modelling (FHM) system 1, constructed according to the principles of the disclosure. The FHM system 1 includes a subsurface region modelling (SRM) server 10 and a communicating device 20. The FHM system 1 can include sensor equipment 30, an implementation tool 40, or a network 50. The various components in the FHM system 1 can be communicatively coupled to each other directly via communication links 5, or via communication links 5 and the network 50.

Figure 2:
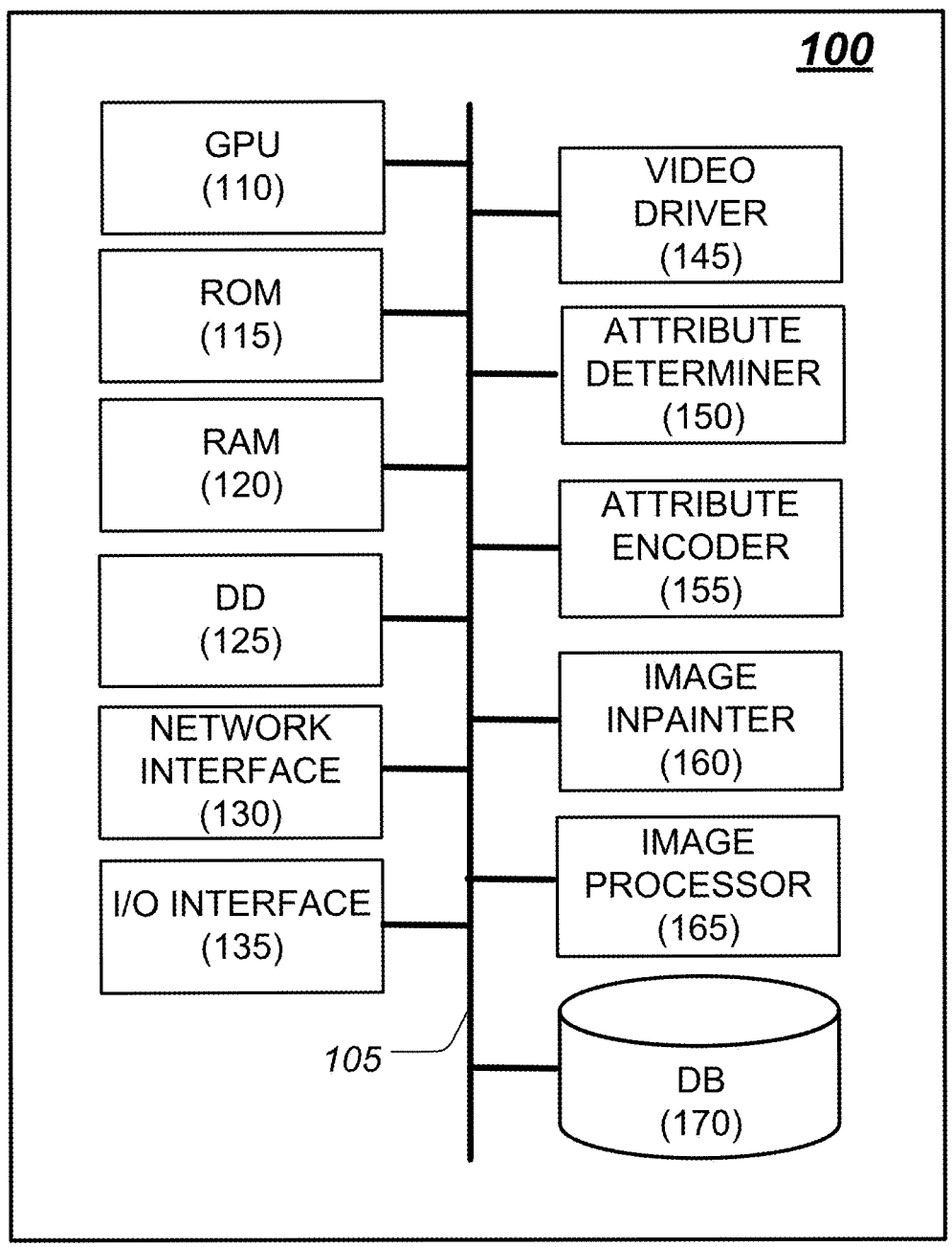
FIG. 2 shows an example of a fast-calculation modelling processor, constructed according to the principles of the disclosure.

The SRM server 10 can include a fast-calculation modelling (FCM) processor 100 (shown in FIG. 2). The SRM server 10 can receive sensor data $S_1, S_2, \ldots S_m$ (where m is a positive integer greater than 2) directly or via the network 50 from land or marine seismic surveys that can be carried out using the sensor equipment 30. The received sensor data can include seismic data, well log data, well test data, production data, and other available data to model a subsurface region. The received sensor data can include prestack seismic data. The received sensor data can include coordinate data or elevation data. The received sensor data can include two-dimensional (2D) data, three-dimensional (3D) data, or four-dimensional (4D) data. The SRM server 10 can filter raw sensor data from different types of noise that might exist in the received sensor data $S_1, S_2, \ldots S_m$ and generate one or more models for a subsurface region based on the raw sensor data. The model can include, for example, a geological model or a reservoir model. The SRM server 10 can carry out a seismic-to-simulation process to construct the model, which can accurately reflect the original well log data, seismic data, well test data, or production data.

The SRM server 10 can generate a seismic model based on the raw sensor data, which can include raw prestack seismic data. The SRM server 10 can generate a geological model based on the seismic model. The SRM server 10 can estimate one or more physical properties, such as, for example, porosity, permeability, density, temperature, pressure, viscosity, fluid content, fluid saturation, or flow rate in a target subsurface region.

The sensor equipment 30 can include one or more transducer devices (not shown) that can be arranged to generate and emit signals, including, for example, acoustic pulses, and receive reflected signals from a target area to form an image (for example, an ultrasound image) of the target area. Each transducer device (not shown) can include an energy source (for example, an ultrasound pulse generator and transmitter) and a receiver (for example, an ultrasound signal receiver). The sensor equipment 30 can include, for example, geophones, seismometers, or other wave energy emitting devices, or wave energy sensing devices. The sensor equipment 30 can include arrays of transmitters or receivers.

The implementation tool 40 can include, for example, a drilling rig (not shown) or wellbore casing installation equipment (not shown) for drilling or casing boreholes. The implementation tool 40 can be fully automated. The implementation tool can include human control. The implementation tool 40 can be positioned at a geographic location based on coordinates determined by the SRM server 10.

FIG. 2 shows a nonlimiting embodiment of a fast-calculation modelling (FCM) processor 100, constructed according to the principles of the disclosure. The FCM processor 100 can receive sensor data $S_1, S_2, \ldots S_m$. The FCM processor 100 can output multiparameter attribute data $A_1, A_2, \ldots A_n$ (where n is a positive integer greater than 2, and where n can be the same as or different from m). The sensor data or attribute data can be received or transmitted over the communication link 5 (shown in FIG. 1). The FCM processor 100 can be arranged to carry out a process 200 (shown in FIG. 3) to calculate prestack seismic attributes from dense and large volumes of prestack seismic data. The process 200 can include calculating attributes in a limited number of locations in time and space on a coarse regular or irregular grid using one or more approaches, such as, for example, migration algorithms. The migration algorithms can include, for example, prestack and poststack migration, time/depth migration, Kirchoff, or beam or wave migration. The process 200 can include infilling of attributes in remaining locations by a trained deep neural network in a fast and efficient way. The process 200 can include multiparameter attributes and a coloring scheme that facilitates estimation of multiparameter attributes simultaneously during a single run. The process 200 can be implemented for applications involving enhancement of prestack seismic data, as well as velocity analysis or seismic tomography.

In a nonlimiting implementation, the FCM processor 100 can be included in the SRM server 10 (shown in FIG. 1). As seen in FIG. 2, the FCM processor 100 can include a graphics processing unit (GPU) 110, a read-only memory (ROM) 115, a random-access memory (RAM) 120, a disk drive (DD) 125, a network interface 130, an input and output (I/O) interface 135, a video driver 145, an attribute determiner 150, an attribute encoder 155, an image inpainter 160, an image processor 165, or a database (DB) 170. The various components in the FCM processor 110 can be connected to a bus 105 via one or more communication links. The FCM processor 100 can receive the sensor data $S_1, S_2, \ldots S_m$ via, for example, the network interface 130, I/O interface 135, DD 125, or the DB 170.

The system bus 105 can be any of several types of bus structures that can further interconnect to a memory bus (with or without a memory controller), a peripheral bus, and a local bus using any of a variety of commercially available bus architectures.

The GPU 110 can be any of various commercially available processors. Dual microprocessors and other multiprocessor architectures can also be employed as the GPU 110. The GPU 110 can be a central processing unit (CPU).

The FCM processor 100 includes a computer-readable medium that can hold executable or interpretable computer code (or instructions) that, when executed by the GPU 110, cause the described steps, processes and methods to be carried out. The computer-readable medium can be provided in the ROM 115, RAM 120, DD 125, DB 170, or an external computer-readable medium connected to the FCM processor 100 via the network interface 130 or the I/O interface 135. The computer readable medium can include sections of computer code that, when executed by the GPU 110 (or the attribute determiner 150, attribute encoder 155, image inpainter 160, or image processor 165) cause the process 200 (shown in FIG. 3) to be carried out, and all other process steps described or contemplated in the description.

A basic input output system (BIOS) can be stored in a non-volatile memory in the FCM processor 100, such as, for example, the ROM 115. The ROM 115 can include a ROM, an erasable programmable read-only memory (EPROM), or an electrically erasable programmable read-only memory (EEPROM). The BIOS can contain the basic routines that help to transfer information between components within the FCM processor 100, such as during start-up.

The RAM 120 can include a high-speed RAM such as static RAM for caching data. The RAM 120 can include a non-volatile random-access memory (NVRAM), solid-state device (SSD), or a burst buffer (BB) for high-performance computing (HPC) environments.

The disk drive (DD) 125 can include a hard drive, such as, for example, an enhanced integrated drive electronics (EIDE) drive, or a serial advanced technology attachments (SATA) drive. The DD 125 can include an optical disk drive that can read from and write to a compact disk read-only memory (CD-ROM) disk (not shown), or, read from or write to other high capacity optical media such as a digital video disk (DVD). The DD 125 can be configured for external use in a suitable chassis (not shown). The DD 125 can be connected to the system bus 105 by a hard disk drive interface (not shown) and an optical drive interface (not shown), respectively. The hard disk drive interface (not shown) can include a Universal Serial Bus (USB) (not shown) or an IEEE 1394 interface (not shown) for external applications.

The DD 125 and associated computer-readable media can provide nonvolatile storage of data, data structures, or computer-executable instructions. The DD 125 can accommodate the storage of any data in a suitable digital format. The DD 125 can include one or more apps that are used to execute aspects of the architecture described in this specification.

A number of program modules can be stored in the DD 125, ROM 115, or RAM 120, including an operating system (not shown), one or more application programs (not shown), other program modules (not shown), and program data (not shown). Any (or all) of the operating system, application programs, program modules, and program data can be cached in the RAM 120 as executable sections of computer code.

The network interface 130 can be connected to the network 50 (shown in FIG. 1). The network interface 130 can include a wired or a wireless communication network interface (not shown) or a modem (not shown). When used in a local area network (LAN), the FCM processor 100 can be connected to the LAN network through the wired or wireless communication network interface; and, when used in a wide area network (WAN), the FCM processor 100 can be connected to the WAN network through the modem. The modem (not shown) can be internal or external and wired or wireless. The modem can be connected to the system bus 105 via, for example, a serial port interface (not shown).

The I/O interface 135 can receive commands and data from an operator via a user interface device (not shown), such as, for example, a keyboard (not shown), a mouse (not shown), a pointer (not shown), a microphone (not shown), a speaker (not shown), or a display (not shown). The received commands and data can be forward to the GPU 110 from the I/O interface 135 as instruction and data signals via the bus 105.

The video driver 145 can include a graphics driver (not shown), a video adaptor (not shown), or any other device necessary to render an image signal on a display device, such as, for example the display device in the communicating device 20 (shown in FIG. 1).

The attribute determiner 150, attribute encoder 155, image inpainter 160, or image processor 165 can each be a device or a module. One or more of the attribute determiner 150, attribute encoder 155, image inpainter 160, and image processor 165 can be integrated with the GPU 110 or provided separately, as seen in FIG. 2.

Figure 3:
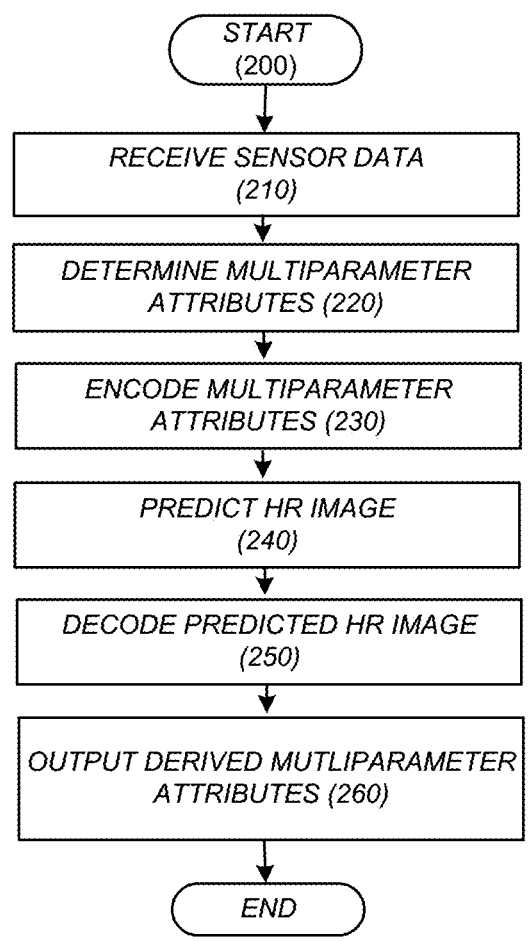
FIG. 3 shows an example of a fast-seismic enhancement process that can be carried out by the fast-calculation modelling processor in FIG. 2.

FIG. 3 shows an example of a fast-seismic enhancement process 200, according to the principles of the disclosure. Referring to FIGS. 2 and 3, sensor data can be received by the FCM processor 100 (Step 210). The received sensor data can include seismic prestack data. The sensor data can include raw seismic data. The received sensor data can be processed by the attribute determiner 150. The attribute determiner can analyze seismic prestack data and calculate multiple parameter (or multiparameter) attributes on a sparse grid (or small array) from the sensor data (Step 220). The attribute determiner 150 can include either a coarse regular grid (or array) or an irregular grid (or array) with refining in more complex areas, or even a random grid (or array) that can allow the FCM processor 100 to capture the main peculiarities in the dataset. The attribute determiner 150 can provide an estimation of the multiparameter attributes on the sparse grid. Multiparameter attributes on a sparse grid can be output from the attribute determiner 150 and forwarded to the attribute encoder 155.

The attribute encoder 155 can associate the received multiparameter attributes with a colored image by an encoding scheme that facilitates treatment of the multiparameter attributes as a single-color image (Step 230). Once the encoded image is obtained (Step 230), the resultant low-resolution color image of the multiparameter attributes can be forwarded to the image inpainter 160. The image inpainter 160 can include a deep neural partially convolutional network that can predict a high-resolution (HR) colored image of the multiparameter attributes (Step 240). The image inpainter 160 can build a high-resolution (HR) colored image of the multiparameter attributes without any gaps or holes. The HR colored image can be output to the image processor 165, which can decode the HR colored image and convert it into multiparameter attributes that are predicted on a dense grid (Step 250). The resultant multiparameter attributes can be output by the FCM processor 100 (Step 260). The multiparameter attributes can be output as attribute data $A_1, A_2, \ldots A_n$ (where n is a positive integer greater than 2 that is the same as, or different from m).

A "high-resolution" color image can comprise an image having, for example, but not limited to, at least a density of 512×512 pixels. A "low-resolution" color image, in the context of this disclosure, is a masked image of the same size as the original, high-resolution image. As such, "low-resolution" refers to a loss of image quality due to zero masking.

Figure 4:
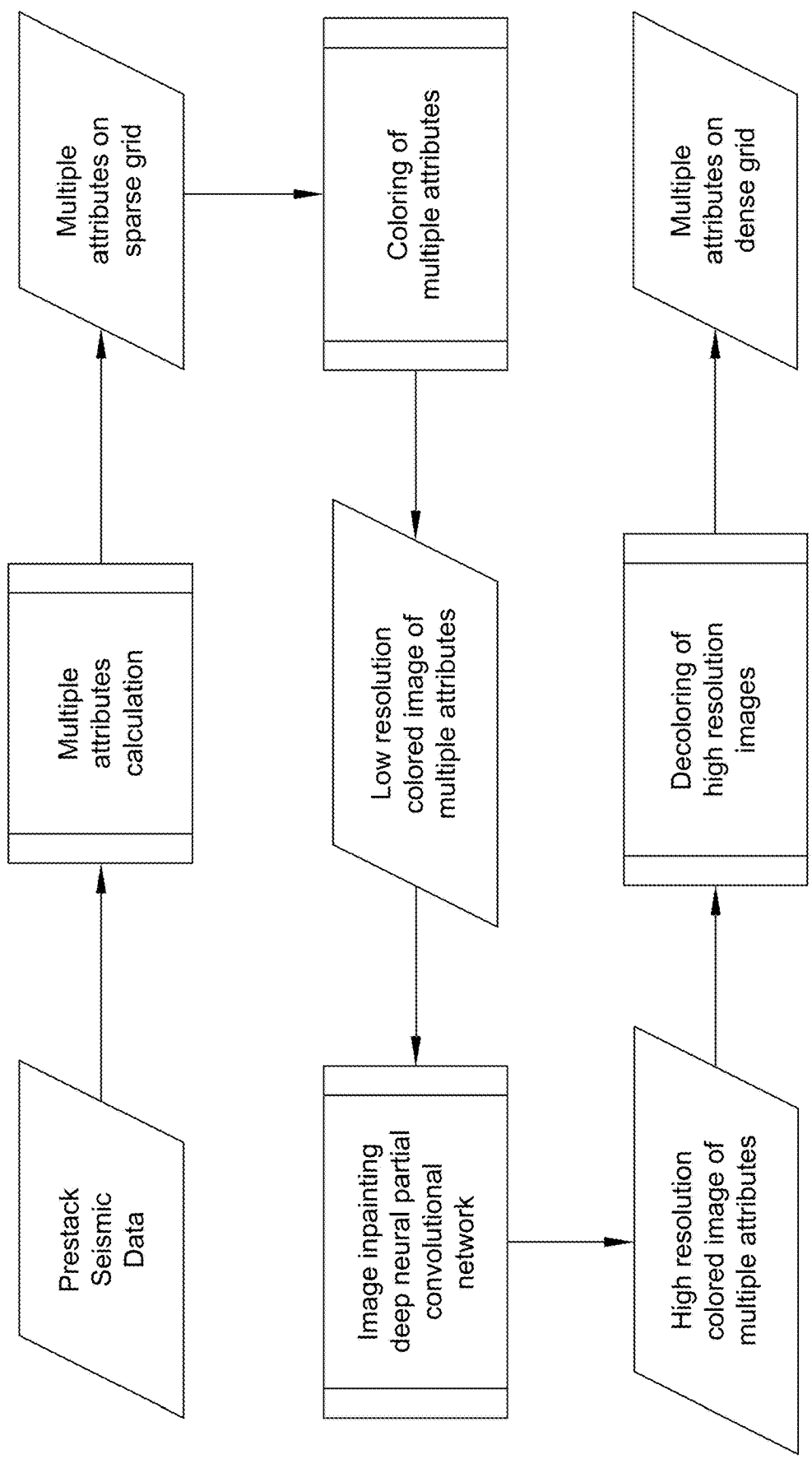
FIG. 4 shows a flowchart of a process being carried out by the fast-calculation modelling processor in FIG. 2.

FIG. 4 shows a flowchart of the process 200 being carried out by the FCM processor 100 (shown in FIG. 2). In FIG. 4, the parallelograms show input and output data and the rectangles show the processes carried out by certain of the components in the FCM processor 100 (shown in FIG. 2). As seen in the flowchart, prestack seismic data can be input to a calculation process that analyzes and calculates multiple attributes on a sparse grid. The calculated multiple attributes can be fed to a coloring process, which can generate color data based on the multiple attributes and output a low-resolution colored image of the multiple attributes to a deep neural partial convolutional network. The deep neural partial convolutional network can process the low-resolution colored image and inpaint or infill gaps or holes in the low-resolution colored image to create a high-resolution colored image of the multiple attributes. The high-resolution colored image can be input to a decoloring process that decodes the high-resolution to multiple attributes on a dense grid.

Figure 5B:
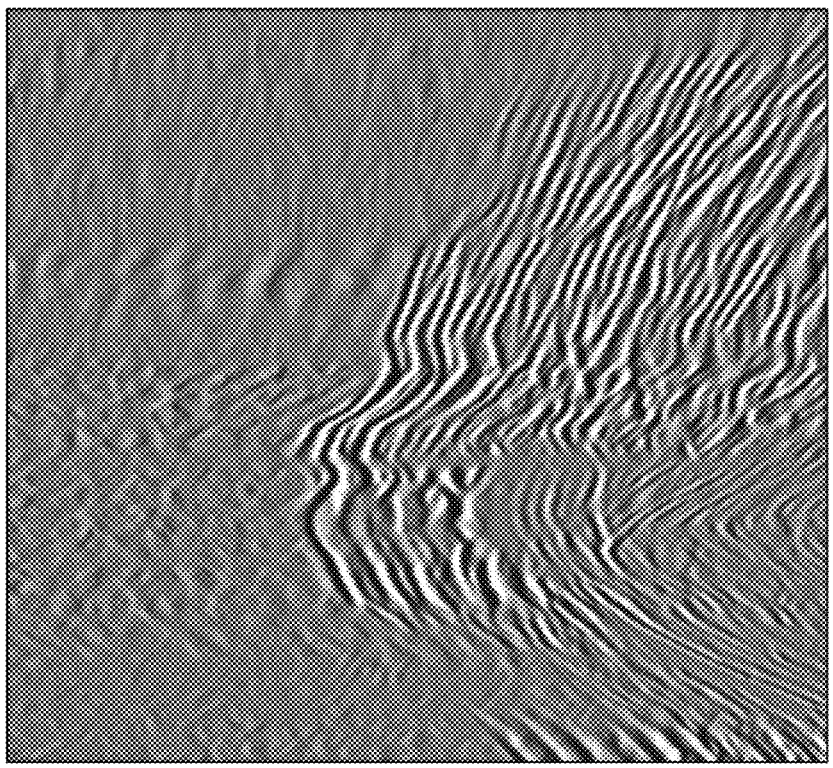
FIGS. 5A and 5B show examples of prestack data before and after nonlinear beamforming, respectively.
Figure 5A:
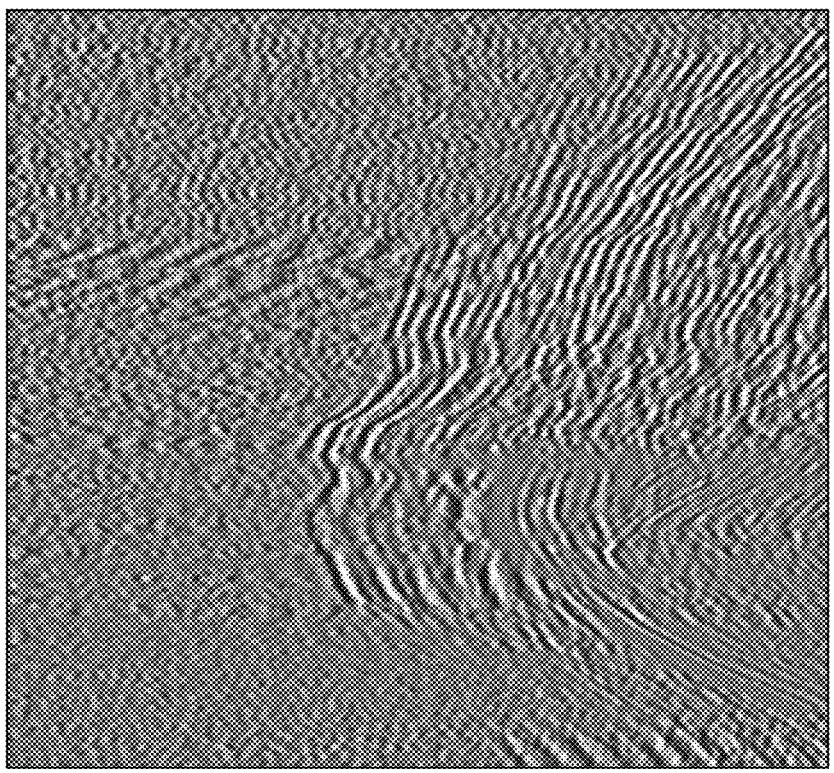

FIGS. 5A and 5B show examples of seismic prestack data before and after nonlinear beamforming, respectively. As seen in FIG. 5B, carrying out the process 200 on the prestack data can result in significant reduction of random noise and increased continuity of main events in estimations of local kinematic parameters used in nonlinear beamforming (NLBF) data enhancement. The estimation part of the NLBF can be based on, for example, an assumption that the wavefront can be locally approximated by a second-order surface providing the following relation for its moveout:

$$\Delta t = t(x,y) - t_0(x_0,y_0) = A\Delta x + B\Delta y + C\Delta x\Delta y + D\Delta x^2 + E\Delta y^2,$$

where A, B, C, D, E are unknown beamforming coefficients and Δx and Δy represent spatial shifts of a summed trace with respect to the output trace; and, where Δt is the travel time from an initial point in time $t(x_0, y_0)$ at an initial position $x_0, y_0$ in an x-y plane to a time t(x, y) at a position x, y in the same x-y plane. The unknown coefficients A, B, C, D, E can be estimated by maximizing values of a semblance function S, representing coherency of local events. Considering an example of this approach in one direction (for example, in the x-direction), the estimation of a dip A, curvature D and semblance S can be simplified greatly. A triplet of multiparameter attributes <A, D, S> for each time-space coordinate (t, x) can be transformed to a <Red, Green, Blue> color image pixel. This transformation can be carried out by, for example, the attribute encoder 155 (shown in FIG. 2). The local kinematic parameters A, D and semblance S can be thought of in terms of colored images, as seen in FIG. 6.

Although one or more examples of the disclosure include three multiparameter attributes, the disclosure can include more (or less) than three multiparameter attributes, such as, for example, four, five, or more multiparameter attributes. Additional multiparameter attributes can include auxiliary attributes such as, for example, orthogonal complements, as well as other attributes.

Figure 6:
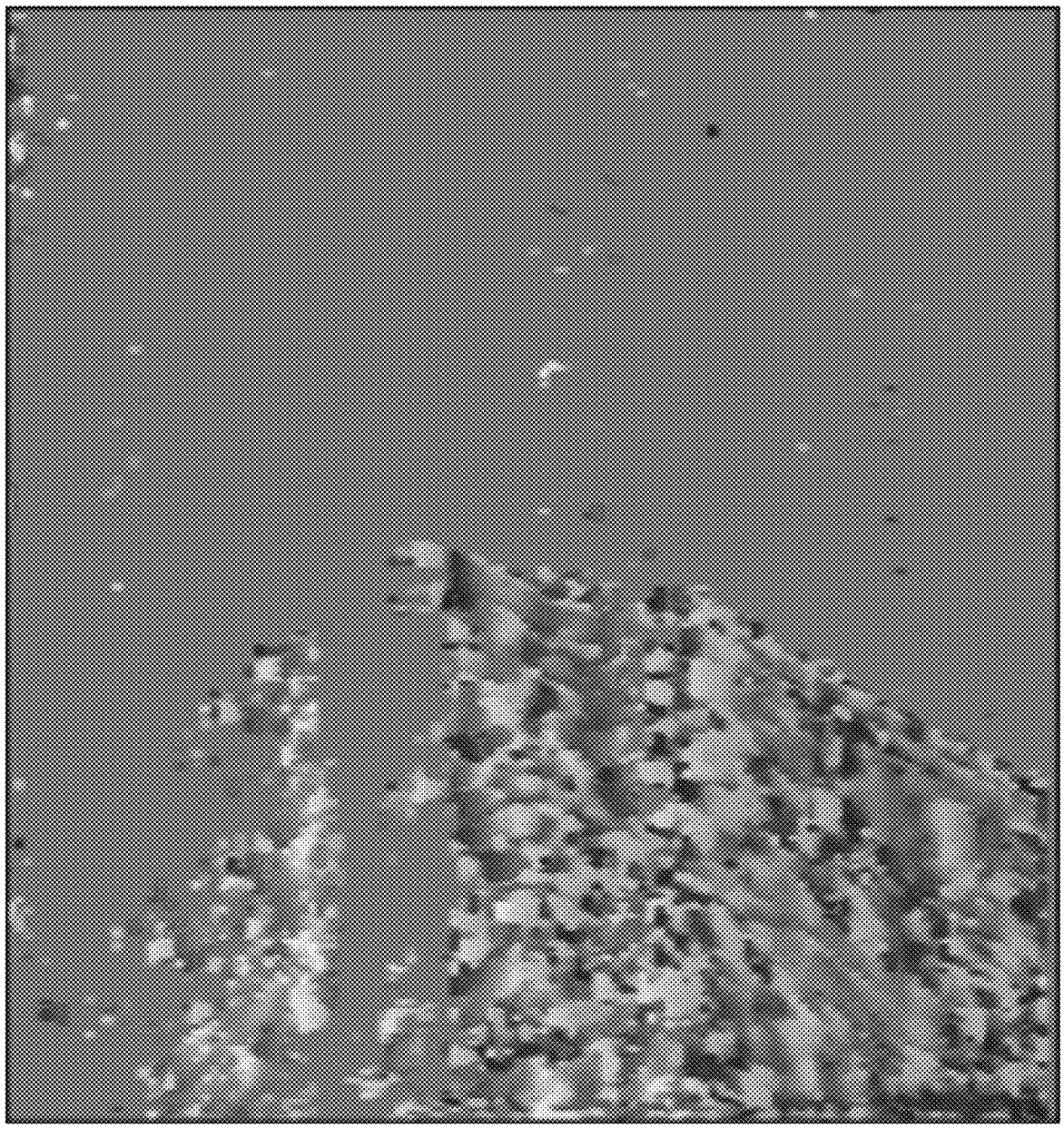
FIG. 6 shows an example of an RGB image representing multiparameter attributes.

FIG. 6 shows a grayscale rendering of an example of an RGB image representing the multiparameter attributes that can be observed at an output of, for example, the attribute encoder 155 (shown in FIG. 2). In FIG. 6, the multiparameter attributes include a locally estimated dip, curvature and semblance.

Attribute estimation can be computationally expensive. To reduce computational time, kinematic parameters can be calculated on an irregular grid by applying a random mask to an original grid. In the point (t, x) where the mask is applied, the kinematic parameter need not be estimated, thereby speeding up the process. In essence, the cumulative area of the mask as a percentage of the total area can represent the total savings in computational cost. The deep neural network (for example, the DNN in the image inpainter 160, shown in FIG. 2) can handle irregular masks.

Figure 7C:
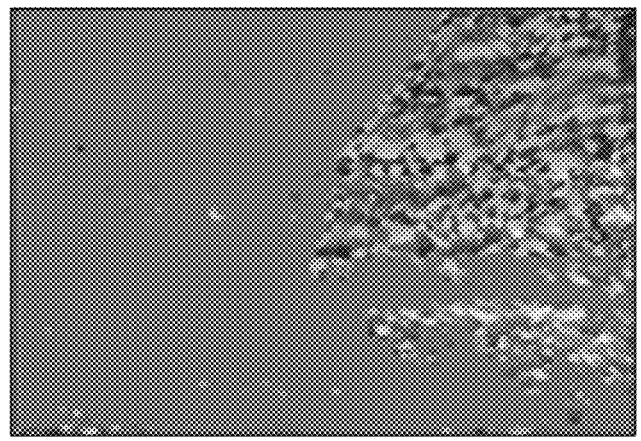
FIGS. 7A, 7B, 7C show an example of a randomly generated image mask (shown in FIG. 7B) applied to an image (FIG. 7A), resulting in an inpainted image (shown in FIG. 7C) being built by a deep neural network (DNN) in the fast-calculation modelling processor in FIG. 2.
Figure 7B:
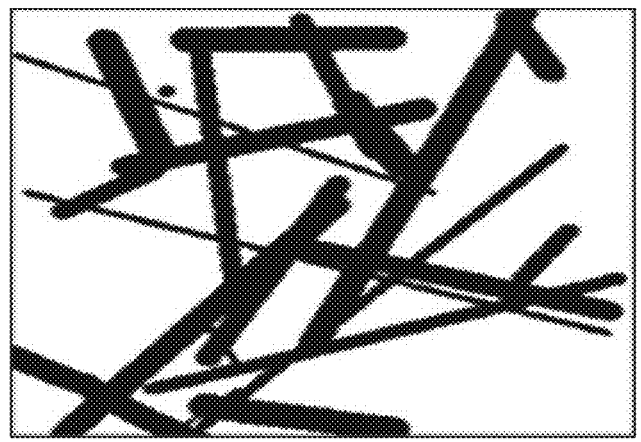
Figure 7A:
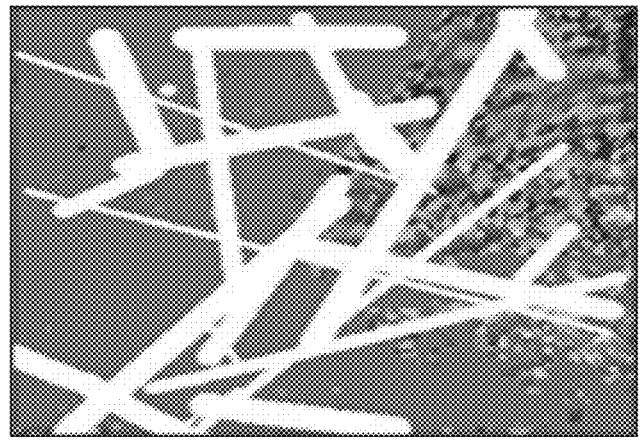

FIGS. 7A, 7B, 7C show grayscale renderings of an example of a randomly generated image mask (shown in FIG. 7B) applied to an image (FIG. 7A), resulting in the image inpainting results image (shown in FIG. 7C) built by the DNN.

The DNN can include a convolutional deep neural network with U-Net architecture, which can include partial convolutions. To properly handle irregular masks, the DNN can use partial convolutions layers comprising a masked and re-normalized convolution operation followed by a mask-update step.

Figure 8A:
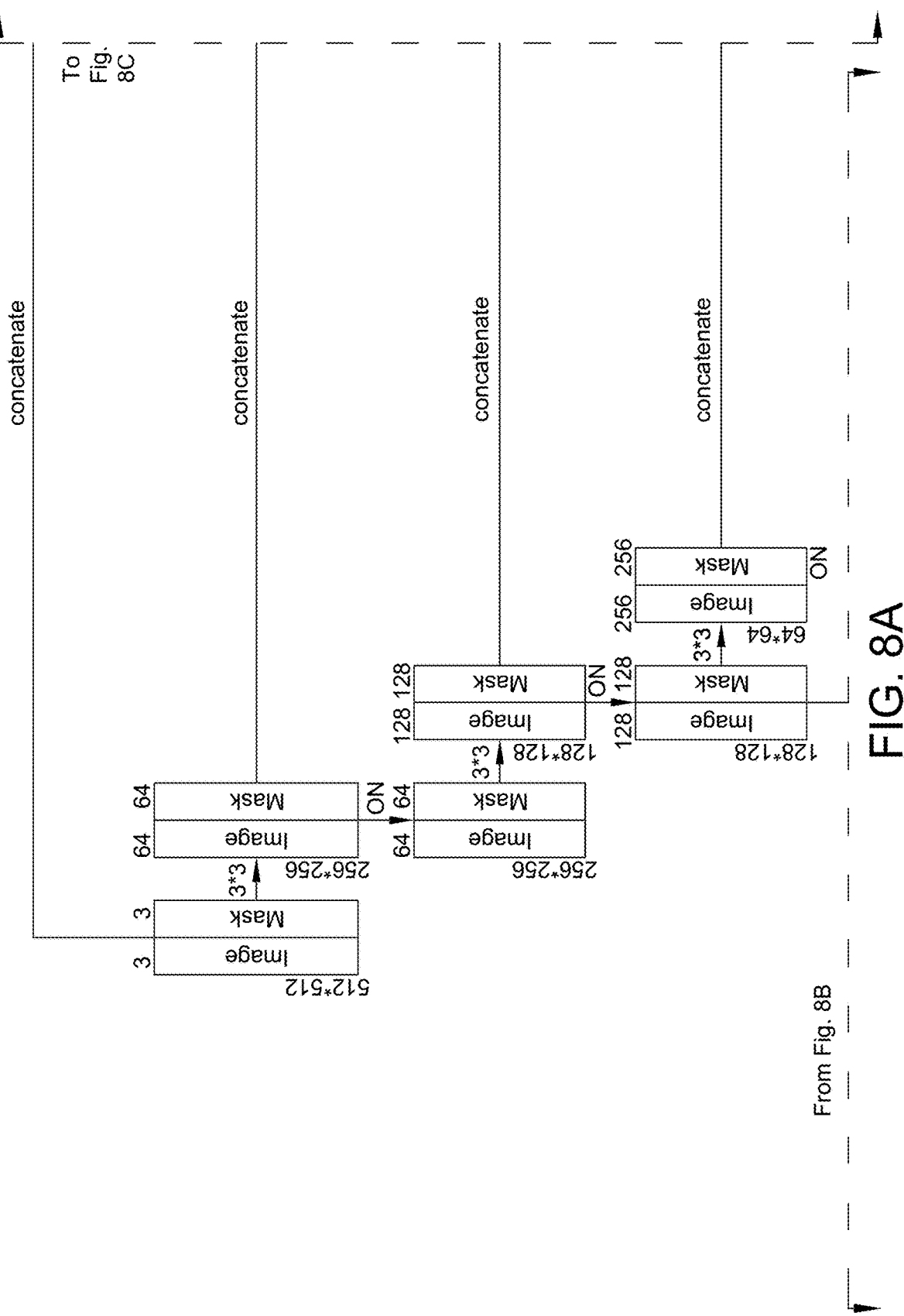
FIGS. 8A-8C show an example of a U-Net DNN architecture with partial convolutional layers that can be included in the DNN in the fast-calculation modelling processor in FIG. 2.
Figure 8B:
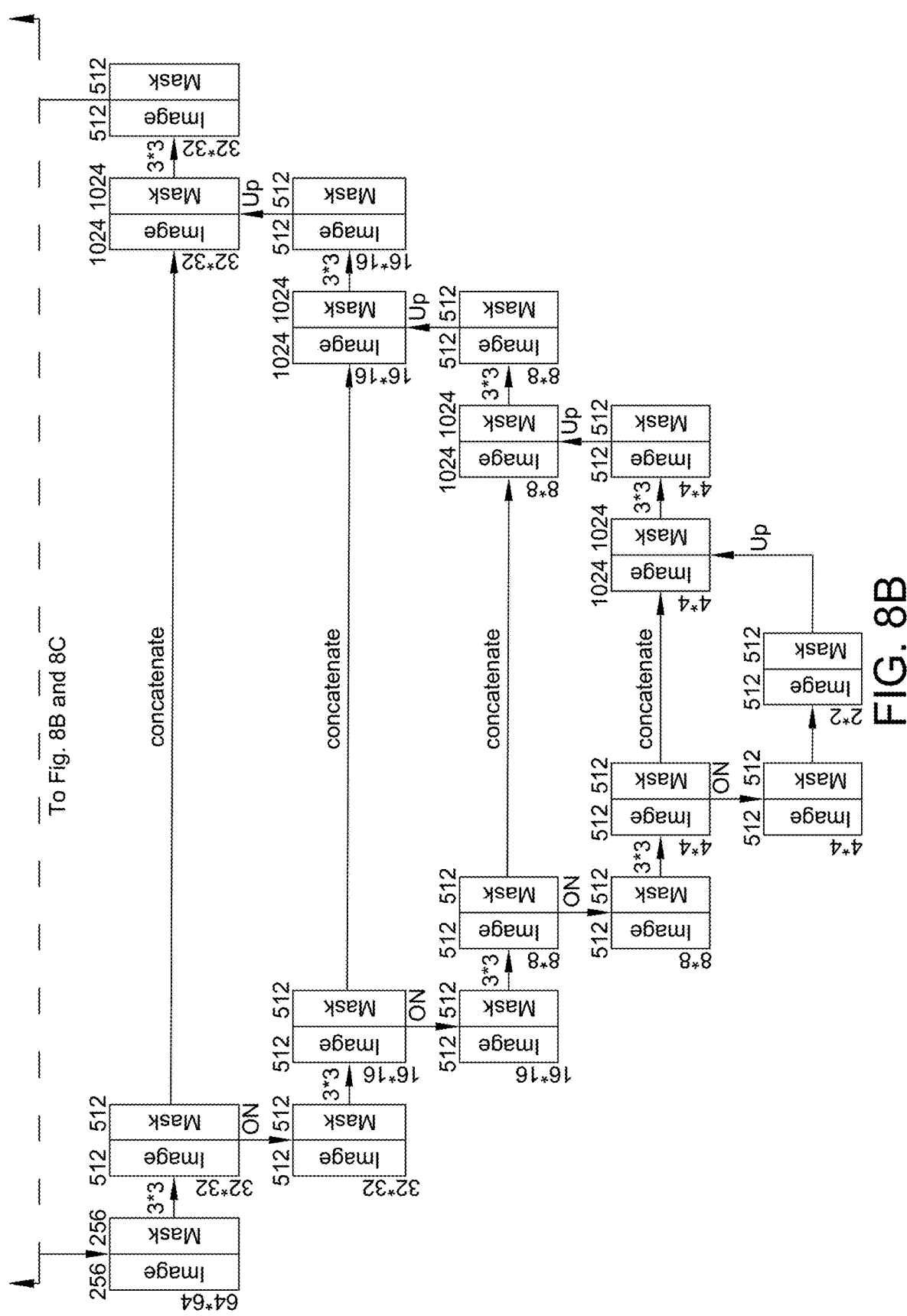
Figure 8C:
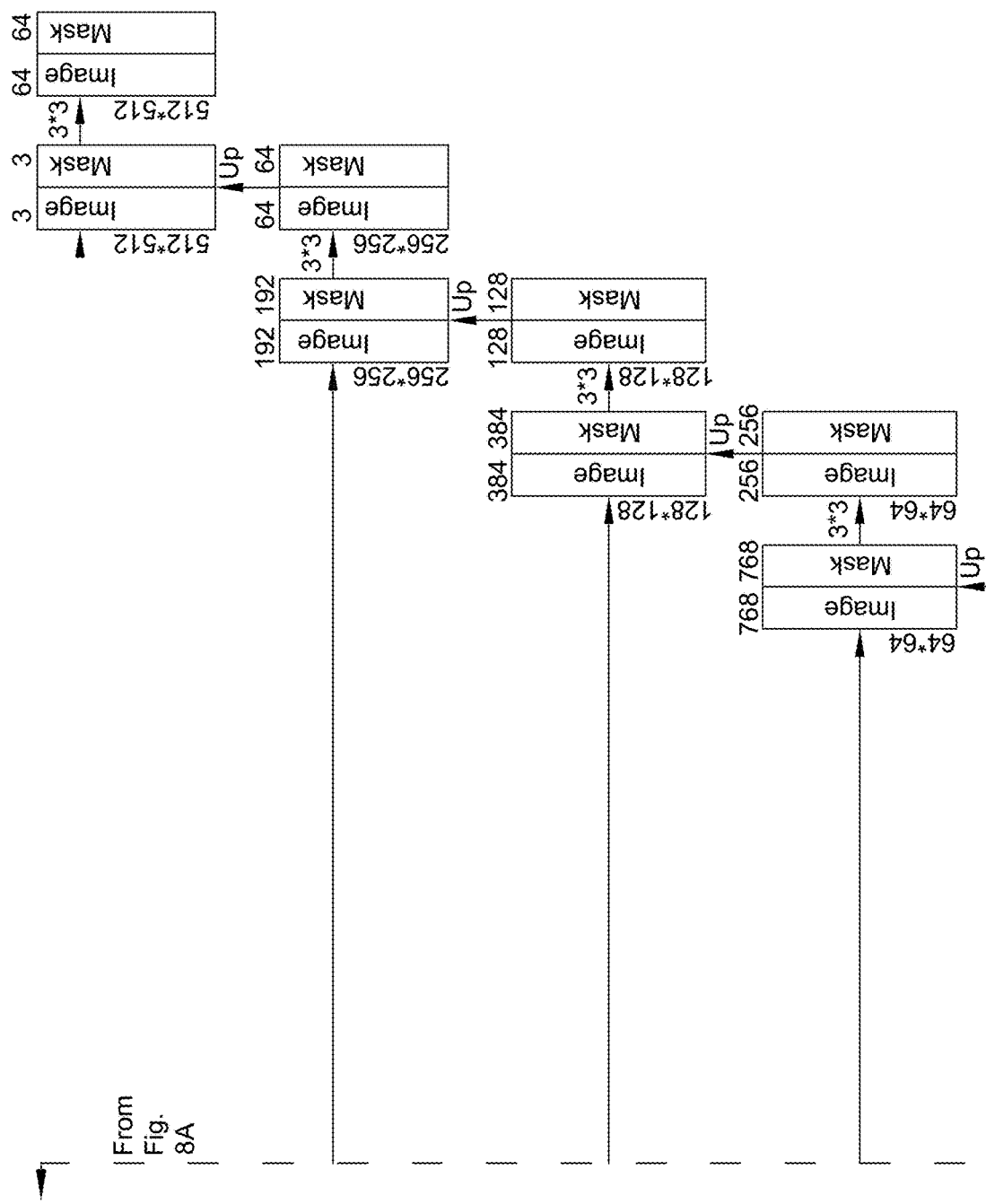

FIGS. 8A-8C show an example of a U-Net DNN architecture with partial convolutional layers that can be included in the DNN and with both mask and image.

The DNN can be trained on a small subset of the prestack seismic data used in NLBF, so the calculation time of creating the training dataset along with time required to train the DNN are negligible. The trained partial convolutional DNN can be used for image in-painting (for example, shown in FIGS. 7A-7C) of encoded kinematic parameters to provide a high-resolution image. Applying decoding to the high-resolution image (for example, by the image processor 165) can finalize the enhancement workflow and provide, for example, the multiparameter attributes shown in FIG. 9.

Figure 9:
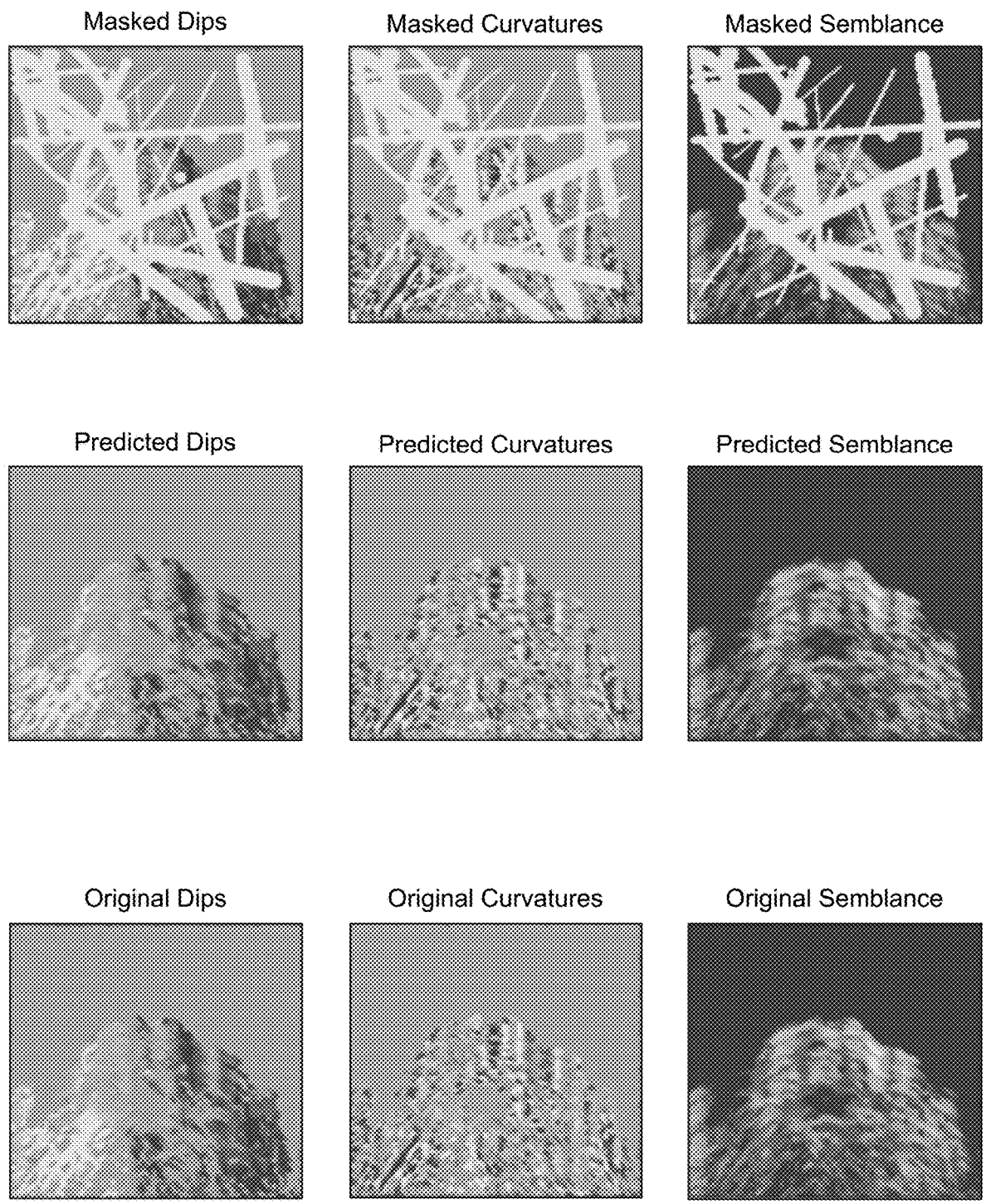
FIG. 9 shows examples of multiparameter attributes in the fast-calculation modelling processor in FIG. 2.

FIG. 9 shows grayscale renderings of examples of the multiparameter attributes that can be output by, for example, the image processor 165 (shown in FIG. 2). Referring from left to right in FIG. 9, the illustrations depict dips, curvatures and semblance. Referring from top to bottom, the illustrations depict masked parameters (input), true parameters (ground truth results used for validation), and parameters predicted by the DNN. As seen in FIG. 9, the infilled attributes using the DNN can be similar to the attributes calculated using NLBF, but the computing resources implemented in the infilling process can be reduced, for example, by a factor of two or more compared to using NLBF. The time consumed by the inpainting process can be negligible in comparison to the time required by, for example, other processes that can be used to estimate kinematic parameters.

According to a nonlimiting embodiment of the disclosure, if the DNN is trained with previously acquired seismic datasets and new datasets are similar enough to the original datasets, then there is zero (or near-zero) computational cost associated with additional training. If the received seismic data differs significantly from the previously acquired seismic datasets, which can be expected to happen in only rare circumstances, then the DNN training or re-training can be achieved on a small, but diverse subset of the new data, representing only a small percentage of the original data volume.

Performance of the DNN can depend on, for example, the complexity of the wavefield and on the density of the original sparse grid (or small digital array) used for initial estimation. A random input grid (or array) can be used for the original sparse grid. Alternatively, a regular grid can be used instead, or in addition to the random input grid. The DNN can estimate parameters in, for example, every second trace, and every second time sample can provide a speed-up of, for example, about four times for a two-dimensional (2D) space, and about eight times for a three-dimensional (3D) cubic space.

Figure 10:
FIG. 10 shows an example of a 2D space, including grid coarsening with application of a 2D mask (gray areas) to a 2D grid (points—grid nodes).

FIG. 10 shows an example of a 2D space, including grid coarsening with application of a 2D mask (gray areas) to a 2D grid (points—grid nodes). A four-times reduction in computing resources can be achieved by, for example, estimating attributes in only the white areas in FIG. 10 and infilling the rest using the DNN.

Figure 11:
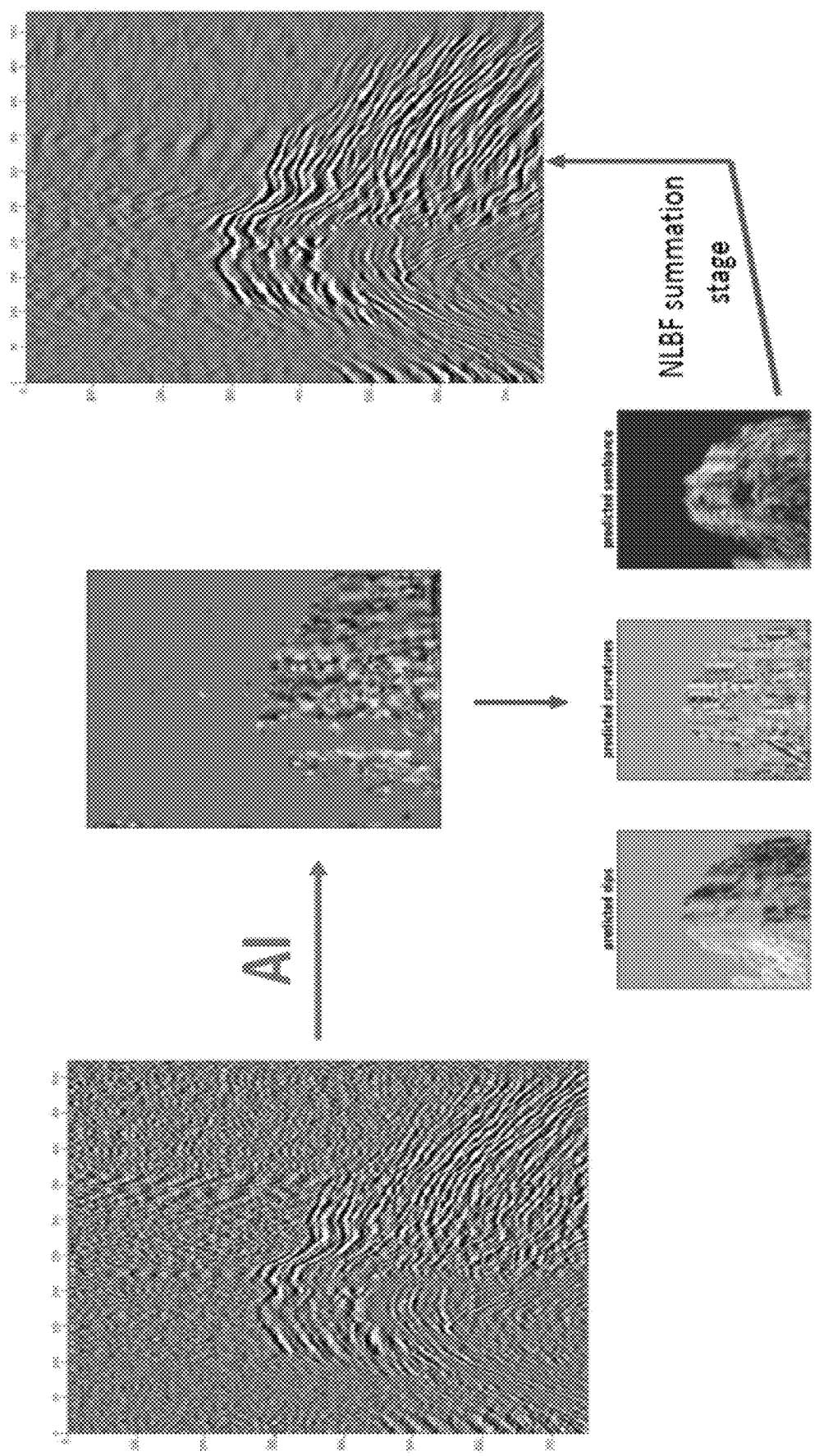
FIG. 11 shows an example of prestack data before and after nonlinear beamforming, including intermediate processing steps, according to the principles of the disclosure.

FIG. 11 shows an example of prestack data before and after nonlinear beamforming by the process 200 (shown in FIG. 3), or the flow diagram (shown in FIG. 4), including intermediate processing steps. As seen in illustrations, attributes can be extracted directly from, for example, prestack seismic data, encoded to a color (shown in grayscale), and then interpolated from a sparse grid into a full grid to output high-resolution image data. As seen in FIG. 11, via a two-stage process, which can be performed by the FCM processor 100 (shown in FIG. 2), prestack seismic data can be analyzed and infilling data interpreted and included as inputs to a nonlinear beamforming stage to create high-resolution image data.

In implementations where the seismic data cube has, for example, five dimensions (for example, shot and receiver coordinates in x and y directions and time), the DNN can estimate parameters in every second point about thirty-two (32) times faster than an NLBF implementation alone, which is a significant decrease in calculation time for huge prestack seismic datasets of hundreds or thousands of terabytes in size.

While the description has provided examples of applications of seismic data enhancement with nonlinear beamforming, it is noted that the same or similar approach can be applied to a wide collection of problems requiring estimation of seismic attributes on massive volumes of prestack seismic data. For example, the disclosure can be applied to estimation of isotropic or anisotropic velocity fields, parameter fields for common-reflection surface (CRS) stack, parameters for multifocusing, or estimation of isotropic and anisotropic Amplitude-versus-offset (AVO). Likewise, in the field of seismic monitoring, where multiple images are obtained in time and corresponding attributes extracted many times over, there is additional benefit of interpolating these parameters with the DNN (for example, in the image inpainter 160) without repeating expensive processing or acquisition.

Acquisition of highly-redundant data can be justified by 1) the ability to extract attributes (such as, for example, velocities that can only be estimated from prestack data), and 2) summation of redundant signals during imaging process to increase signal-to-noise ratio. Computational requirements can be lessened by requiring only a fraction of the data to be acquired for sparser estimations, and infilling remaining attributes via the DNN. The disclosure can facilitate cost-effective seismic or geophysical acquisition.

The disclosure provides significant advances in seismic processing results of modern high-channel count and signal-sensor data and enables extracting more usable information from the modern land data surveys leading to better oil and gas exploration.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G or 4G cellular standards, or Bluetooth.

The terms "computer" or "computing device," as used in this disclosure, means any machine, device, circuit, component, or module, or any system of machines, devices, circuits, components, or modules which are capable of manipulating data according to one or more instructions, such as, for example, without limitation, a processor, a microprocessor, a graphics processing unit, a central processing unit, a general purpose computer, a super computer, a personal computer, a laptop computer, a palmtop computer, a notebook computer, a desktop computer, a workstation computer, a server, a server farm, a computer cloud, or an array of processors, microprocessors, central processing units, general purpose computers, super computers, personal computers, laptop computers, palmtop computers, notebook computers, desktop computers, workstation computers, or servers.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and their variations, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, or the Internet, any of which can be configured to communicate data via a wireless or a wired communication medium. These networks can run a variety of protocols not limited to TCP/IP, IRC or HTTP.

The term "server," as used in this disclosure, means any combination of software or hardware, including at least one application or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the present disclosure, which is defined by the set of recitations in the following claims and by structures and functions or steps which are equivalent to these recitations.

What is claimed is:

1. A method of modelling a subsurface region of the earth for hydrocarbon exploration, development, or production, the method comprising:
   receiving a seismic prestack dataset;
   determining one or more multiparameter attributes on a sparse grid based on the seismic prestack dataset;
   associating the one or more multiparameter attributes with color image pixels;
   encoding the associated one or more multiparameter attributes to generate a low-resolution colored image;
   inpainting the low-resolution colored image by a deep neural network to build a high-resolution colored image; and
   decoloring the high-resolution image.

2. The method in claim 1, further comprising:
   converting the colored image into multiparameter attributes that are predicted on a dense grid.

3. The method in claim 1, wherein the sparse grid comprises a coarse regular grid.

4. The method in claim 1, wherein the sparse grid comprises a coarse irregular grid.

5. The method in claim 1, further comprising:
   estimating local kinematic parameters using a nonlinear beamforming data enhancement process.

6. The method in claim 1, wherein the multiparameter attributes comprise a dip, a curvature or a semblance.

7. The method in claim 1, further comprising:
   transforming a triplet of the multiparameter attributes for each time space coordinate (t, x) to a red (R) color pixel, a green (G) color pixel, or a blue (B) color pixel.

8. The method in claim 1, further comprising:
   determining a kinematic parameter on an irregular grid.

9. The method in claim 8, wherein the determining the kinematic parameter on the irregular grid comprises applying a random mask to an original grid.

10. An apparatus for modelling a subsurface region of the earth for hydrocarbon exploration, development, or production, the apparatus comprising:
    an interface arranged to receive seismic prestack data;
    an attribute determiner arranged to calculate a plurality of attributes on a sparse grid based on the seismic prestack data;
    an attribute encoder arranged to convert the plurality of attributes to a low-resolution colored image;
    an image inpainter arranged to infill the low-resolution colored image to generate a high-resolution colored image; and
    an image processor arranged to convert the high-resolution colored image into multiparameter attributes that are predicted on a dense grid.

11. The apparatus in claim 10, wherein the image inpainter comprises a convolutional deep neural network with U-Net architecture.

12. The apparatus in claim 10, wherein the sparse grid comprises a coarse regular grid.

13. The apparatus in claim 10, wherein the sparse grid comprises a coarse irregular grid.

14. The apparatus in claim 10, wherein the image inpainter comprises a nonlinear beamforming data enhancement process.

15. The apparatus in claim 10, wherein the multiparameter attributes comprise a dip, a curvature or a semblance.

16. The apparatus in claim 10, wherein the attribute encoder transforms a triplet of the multiparameter attributes for each time space coordinate (t, x) to a red (R) color pixel, a green (G) color pixel, or a blue (B) color pixel.

17. The apparatus in claim 10, wherein the attribute determiner calculates a kinematic parameter on an irregular grid.

18. The apparatus in claim 10, wherein the attribute determiner applies a random mask to an original grid to calculate a kinematic parameter on an irregular grid.

19. A non-transitory computer readable storage medium storing subsurface modelling program instructions that, when executed by a computing device, cause a model of a subsurface region of the earth for hydrocarbon exploration, development or production to be rendered on a display device, the program instructions comprising the steps of:
    receiving a seismic prestack dataset;
    determining one or more multiparameter attributes on a sparse grid based on the seismic prestack dataset;
    associating the one or more multiparameter attributes with color image pixels;
    encoding the associated one or more multiparameter attributes to generate a colored image;
    inpainting the low-resolution colored image by a deep neural network to build a high-resolution colored image; and
    decoloring the high-resolution image.

20. The non-transitory computer readable storage medium in claim 19, the program instructions comprising the further step of:
    converting the colored image into multiparameter attributes that are predicted on a dense grid.

21. The non-transitory computer readable storage medium in claim 19, wherein the sparse grid comprises a coarse regular grid.

22. The non-transitory computer readable storage medium in claim 19, wherein the sparse grid comprises a coarse irregular grid.

23. The non-transitory computer readable storage medium in claim 19, the program instructions comprising the further step of:
    estimating local kinematic parameters using a nonlinear beamforming data enhancement process.

24. The non-transitory computer readable storage medium in claim 19, wherein the multiparameter attributes comprise a dip, a curvature or a semblance.

25. The non-transitory computer readable storage medium in claim 19, the program instructions comprising the further step of:
    transforming a triplet of the multiparameter attributes for each time space coordinate (t, x) to a red (R) color pixel, a green (G) color pixel, or a blue (B) color pixel.

26. The non-transitory computer readable storage medium in claim 19, the program instructions comprising the further step of:
    determining a kinematic parameter on an irregular grid.

27. The non-transitory computer readable storage medium in claim 26, wherein the determining the kinematic parameter on the irregular grid comprises applying a random mask to an original grid.

* * * * *